United States Patent [19]
Hashida

[11] Patent Number: 5,526,731
[45] Date of Patent: Jun. 18, 1996

[54] HYDRAULIC BOOSTER

[75] Inventor: Koichi Hashida, Itami, Japan

[73] Assignee: Sumitomo Electric Industries, Ltd., Osaka, Japan

[21] Appl. No.: 504,650

[22] Filed: Jul. 20, 1995

[30] Foreign Application Priority Data

Jul. 21, 1994 [JP] Japan .................................. 6-169497

[51] Int. Cl.⁶ ..................................................... F15B 9/10
[52] U.S. Cl. ............................ 91/376 R; 91/446; 60/552
[58] Field of Search ................................. 91/376 R, 378, 91/446; 60/552

[56] References Cited

U.S. PATENT DOCUMENTS 4,463,561  8/1984  Leiber ........................................ 60/552

Primary Examiner—F. Daniel Lopez
Attorney, Agent, or Firm—Wenderoth, Lind & Ponack

[57] ABSTRACT

The valve portion of pressure control valve tends to be unstable because when the valve is opened, the valve opening pressure intensifies. To prevent this, the valve portion of the pressure control valve is in the form of a puppet valve so that the valve body of the valve portion receives the pressure of a dynamic pressure source in the valve-opening direction and receives the pressure of an fluid pressure introducing chamber in the valve-closing direction. With this arrangement, when the valve opens and the dynamic pressure source pressure drops, the valve-closing force increases, so that the pressure control valve shows a stronger tendency to close. This prevents the freefall of the pressure source pressure, so that the behavior of the valve portion stabilizes. Thus, it is possible to prevent vibrations and abnormal noise.

6 Claims, 3 Drawing Sheets

HYDRAULIC BOOSTER

BACKGROUND OF THE INVENTION

The present invention relates to a hydraulic booster for amplifying a manual control force by producing an auxiliary dynamic pressure, and more particularly to a hydraulic booster for amplifying the output of a hydraulic master cylinder as a braking force generator of an automobile.

A hydraulic booster of this type is adapted to apply a dynamic pressure on the backside of a power piston after controlling it to a level proportional to the force applied to the brake pedal by opening and closing its valve unit. The valve unit is opened or closed according to the relative position between an input rod and the power piston. Namely, when the power piston is retracted relative to the input rod, the pressure of the dynamic pressure source is introduced into the dynamic pressure chamber to increase the dynamic pressure output. When the power piston is advanced relative to the input rod, the dynamic pressure chamber is opened to the reservoir to depressurize the dynamic pressure chamber.

In one conventional arrangement, this control is carried out by a valve unit provided in the power piston so as to move together with the power piston and the input rod. In another arrangement, the relative position between the piston and the rod is detected and transmitted to a fixed valve unit provided separate from the piston and the rod.

Of these two arrangements, the latter requires a completed and expensive link mechanism. Thus, most of conventional boosters employ the former arrangement.

In the former arrangement, it is necessary to introduce the pressure of the dynamic pressure source into the axially movable power piston. There are two known ways to do this. One is to connect the outlet of the dynamic pressure source with the valve chest formed in the power piston by means of a flexible hose. The other is to provide an annular fluid pressure introducing chamber around the power piston so as to communicate with the valve chest through a hole formed in the power piston. In the latter method, it is necessary to provide high-pressure seals on both sides of the chamber to seal the chamber while allowing sliding movement of the piston. Of these two methods, the latter is generally preferred to the former because the flexible hose used in the former method has durability-related problems.

But the latter method is not without problems, either. Namely, since the fluid pressure introducing chamber is in direct fluid communication with the dynamic pressure source, the two seals defining the chamber are always subjected to high pressure equal to the pressure of the dynamic pressure source. This necessarily leads to increased sliding resistance of the seal, which in turn makes it necessary to use a stronger return spring to return the power piston to its original position. Thus, when the brake pedal is depressed, the power piston will not move soon, but begins to move only after the force applied to the piston exceeds the sum of the sliding resistance of the seals and the force of the return spring. This impairs the brake pedal feeling in the initial stage of its stroke. Moreover, since the seals are forced to slide while being subjected to high pressure equal to the pressure of the dynamic pressure source, they have to be formed from a sufficiently durable material. Durable material is usually not only expensive but tends to incur further increase in the sliding resistance of the seals.

One solution to this problem is proposed in EP 296614 B1. The hydraulic booster disclosed in this publication has a pressure control valve provided between the dynamic pressure source and the fluid pressure introducing chamber to keep the pressure in the latter chamber higher by a predetermined level than the pressure in the dynamic pressure chamber by opening and closing the passage connecting the dynamic pressure source with the chamber.

As such pressure control valves, the publication 64-1652 discloses a spool valve and another valve having a check valve and a piston carrying a pin adapted to push up the check valve. The valve of the latter type is also known from FR-A 2604673 and U.S. Pat. No. 4,463,561.

A spool valve has a problem in that it is difficult to prevent leakage of fluid while the valve is closed. In order to prevent fluid leakage so that it can be used as a pressure control valve, its piston and piston case have to be finished to extremely narrow tolerances so that there will be practically no clearance therebetween. Such precise machining is, however, practically impossible. Thus, we studied a hydraulic booster including the valve of the latter type. But this booster also turned out to be practically useless because it frequently caused vibrations of the brake pedal and abnormal noise when the brake pedal is depressed.

FIG. 1 shows a hydraulic booster disclosed in EP 296614 B1. It comprises a body 2 having a bore; a power piston 1 axially slidably mounted in the bore of the body 2; an input rod 3 provided behind the power piston 1; a spool valve 4 axially slidably mounted in a valve chest formed in the power piston 1; a dynamic pressure chamber 5 for applying dynamic pressure on part of the backside of the power piston 1; a fluid pressure introducing chamber 6 provided between the bore of the body 2 and the outer periphery of the power piston 1 and connected to an output circuit of a pump 11; high-pressure seals 7, 8 provided in the front and rear of the chamber 6 to seal it while allowing sliding movement of the piston 1; a return spring 9 for the power piston 1; a return spring 10 for the spool valve 4; a reservoir 12; and an accumulator 13. Numerals 14, 15 and 16 indicate holes, 17 a depressurization passage, and 18 a fluid passage. Numeral 30 designates a pressure control valve. It includes a piston 36 carrying a push pin 35, an offset spring 34 biasing the piston 36 toward a chamber 32, and a ball valve 37 for opening and closing the passage connecting the dynamic pressure source with the chamber 32. The ball valve 37 is moved between its open and closed positions by reciprocating the piston 36.

The relation of forces produced in the pressure control valve 30 is given by the following formula:

$$F + P_3 \cdot A = P_1 \cdot B + P_2 \cdot (A-B) \tag{1}$$

wherein A is the sectional area of the piston 36; B is the sealing area of the ball valve 37; P1 is the pressure of the dynamic pressure source; P2 is the pressure in the fluid pressure introducing chamber 6; P3 is the pressure in the dynamic pressure chamber 5; and F is the force of the spring 34. The value B can be made substantially smaller than the value A. Thus, P2 = P3 + F/A. Immediately after the brake pedal is depressed, the pressure P3 in the dynamic pressure chamber 5 is still small, so that the pressure P2 in the chamber 6 is substantially equal to F/A. For example, if the pressure P1 in the dynamic pressure source is 160 kg/cm$^2$, F/A = 10–20 kg/cm$^2$. Thus, the slide resistance is kept sufficiently low.

But actually, one cannot ignore the influence of the pressure P1 of the dynamic pressure source. Namely, the pressure control valve 30 opens when the formula (1) is met. The moment the valve 30 opens, the flow speed of the fluid present between the pump 11 and the pressure control valve 30 increases sharply, so that the pressure at the inlet of the pressure control valve, which is equal to the pressure P1 of the dynamic pressure source, drops sharply to the level substantially equal to P2. The longer the pipe between the pump 11 and the pressure-control valve 30, the more quickly the pressure at the inlet of the valve 30 tends to drop due to the influence of the inertia and viscosity of the fluid in the pipe. When the pressure at the inlet of the valve 30 drops to P2, the following relation is met:

$$F + P_3 \cdot A = P_2 \cdot A \qquad (2)$$

In this state, the pressure control valve 30 shows a tendency to increase the pressure P2, i.e. a tendency to open. Thus, the moment the valve 30 begins to open, the valve-opening tendency intensifies. As a result, the pressure at the inlet of the pressure control valve decreases still further. The valve closing force overcomes the valve opening force only after the pressure P2 increases to a level at which the formula (2) is met. In this state, the pressure at the inlet of the pressure control valve increases to the level equal to the pressure P1 of the dynamic pressure source. Now, the pressure control valve is kept closed until the pressure at the inlet of the pressure control valve 30 decreases to the level equal to the pressure P2, i.e. the level at which the formula (1) is met. Thus, the pressure control valve swings between the states represented by the formulas (1) and (2). This unstable state of the valve 30 causes vibrations of the spool valve 4 and thus the vibrations of the brake pedal and abnormal noise in the booster.

An object of the present invention is to provide a hydraulic booster which has a pressure control valve and is free of vibration and abnormal noise.

SUMMARY OF THE INVENTION

According to the present invention, there is provided a hydraulic booster including a pressure control valve having the function of keeping the pressure in the fluid pressure introducing chamber higher by a predetermined level than the pressure in the dynamic pressure chamber, characterized in that the pressure control valve has a valve portion in the form of a poppet valve for opening and closing the passage connecting the dynamic pressure source with the fluid pressure introducing chamber, the valve portion having a valve body on which the pressure of the dynamic pressure source acts in a direction to open the valve and the pressure in the fluid pressure introducing chamber acts in a direction to close the valve.

When the valve portion of the pressure control valve opens, pressure fluid flows from the dynamic pressure source into the fluid pressure introducing chamber, increasing the pressure in the latter. According to the present invention, the pressure in the fluid pressure introducing chamber is adapted to act on the valve body of the valve portion in a direction to close the valve. Thus, when the pressure control valve opens and the pressure at the inlet of the valve portion drops, the valve shows a stronger tendency to close than to open.

Thus, the behavior of the valve portion stabilizes. This leads to reduced vibration and noise of the booster, which in turn improves the brake pedal feeling during the initial stage of the pedal stroke. It is also possible to use less expensive seals. The pressure control valve claimed in claim 2 is especially simple in structure and inexpensive.

Since the pressure control valve shows a strong tendency to close when opened, the original purpose of providing a pressure control valve, i.e. the purpose of reducing the pressure in the fluid pressure introducing chamber, is achievable.

This booster may further comprise a pressure differential compensation means adapted to displace toward the dynamic pressure chamber when the pressure difference between the dynamic pressure chamber and the fluid pressure introducing chamber reaches a predetermined value in order to prevent an excessive rise in the surface contact pressure between the valve body and the fixed valve seat and thus to increase the durability of the pressure control valve. By using part of the pressure control piston as the pressure differential compensation means, it is possible to further simplify the structure of the pressure control valve.

In the embodiments, we only show and describe an improved form of the conventional booster shown in FIG. 1. But the concept of the present invention is equally applicable to other types of boosters, such as those disclosed in U.S. Pat. No. 4,463,561 and FR-A 2604673.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
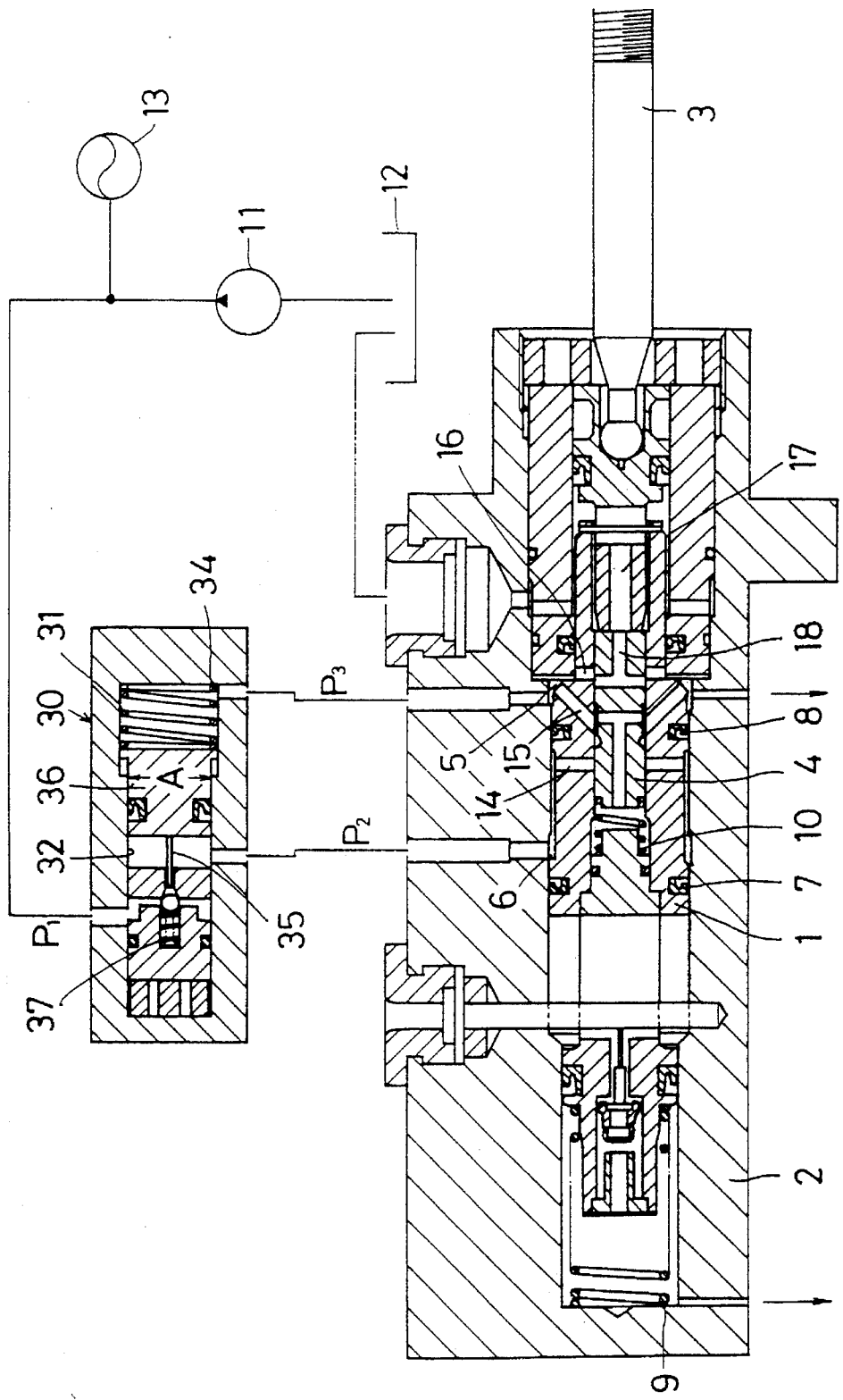
FIG. 1 is a sectional view of a conventional hydraulic booster.
Figure 2:
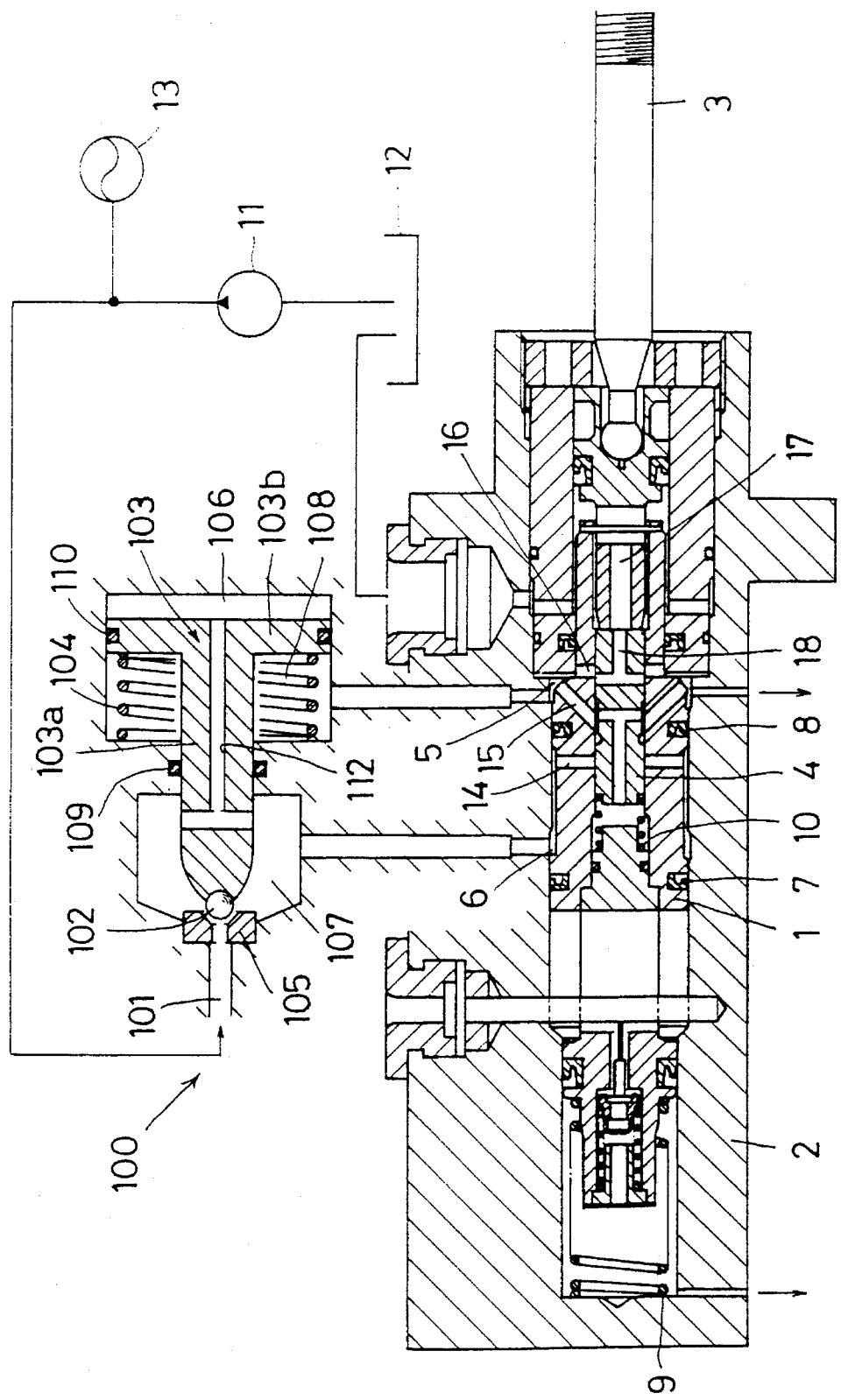
FIG. 2 is a sectional view of a hydraulic booster of one embodiment according to the present invention.

FIG. 2 shows a first embodiment of a hydraulic booster according to the present invention. It comprises a body 2 having a bore; a power piston 1 axially slidably mounted in the bore of the body 2; an input rod 3 provided behind the power piston 1; a spool valve 4 axially slidably mounted in a valve chest formed in the power piston 1; a dynamic pressure chamber 5 for applying dynamic pressure on part of the backside of the power piston 1; a fluid pressure introducing chamber 6 provided between the inner wall of the bore of the body 2 and the outer periphery of the power piston 1 and connected to a discharge circuit of a pump 11; high-pressure seals 7, 8 provided in front and rear of the chamber 6 to seal it while allowing sliding movement of the piston 1; a return spring 9 for the power piston 1; a return spring 10 for the spool valve 4; a reservoir 12; and an accumulator 13. Numerals 14, 15 and 16 indicate holes, 17 a depressurization passage, and 18 a fluid passage.

Numeral 100 designates a pressure control valve. It comprises a valve portion made up of a valve body 102 and a fixed valve seat 105, a stepped pressure control piston 103 having a small-diameter portion 103a and a large-diameter portion 103b, a first fluid chamber 107 accommodating the valve portion, a second fluid chamber 108 adjoining the first fluid chamber 107 and consisting of sub-chambers 104 and 106 separated by the large-diameter portion 103b of the pressure control piston 103, and a spring in sub-chamber 104 biasing the pressure control piston 103 toward its large-diameter side (in the valve-opening direction).

The small-diameter portion 103a of the pressure control piston is slidably inserted through a wall partitioning the chambers 108 and 107. A seal 109 is fitted between the partitioning wall and the small-diameter portion 103a to provide a fluid-tight seal. The position of the valve body 102 is associated with the movement of the pressure control piston 103. Thus, by moving the piston 103, the fluid passage between the chamber 107 and a chamber 101 connected to a dynamic pressure source is selectively opened and closed.

The chamber 106 communicates with the chamber 107 through a passage 112 (which is formed through the pressure control piston 103 in the embodiment but may be formed in the body). The chamber 107 communicates with the fluid pressure introducing chamber 6 of the booster. The chamber 108 communicates with the dynamic pressure chamber 5.

The relation of forces produced in the pressure control valve 100 is given by the following formulas:

$$F+P_1 \cdot B+P_2 \cdot (C-B)+P_3 \cdot (A-C)=P_2 \cdot A$$

$$F+P_1 \cdot B+P_3 \cdot (A-C)=P_2 \cdot (A-C+B) \qquad (3)$$

wherein A is the sectional area of the large-diameter portion of the pressure control piston 103; B is the sealing area of the valve body 102; C is the sectional area of the small-diameter portion 103a of the piston; P1 is the pressure of the dynamic pressure source; P2 is the pressure in the fluid pressure introducing chamber 6; P3 is the pressure in the dynamic pressure chamber 5; and F is the force of the spring 104. As in the case of a conventional pressure control valve, the value B can be made substantially smaller than the value (A−C). In this case, substantially P2=P3+F/(A−C). Immediately after the brake pedal is depressed, the pressure P3 in the dynamic pressure chamber 5 is still small, so that the pressure P2 in the chamber 6 is substantially equal to the value F/A. Thus, the slide resistance is kept sufficiently low.

The valve 100 has the following characteristics. When the formula (3) is met, the pressure control valve 100 opens, and at the same time, the pressure at the inlet of the pressure control valve 103 drops from the pressure P1 of the dynamic pressure source. This drop in pressure tends to urge the pressure control piston 103 in the valve closing direction, as will be apparent from formula (3).

Namely, the pressure control valve of this invention is free of the problem observed in conventional pressure control valves, i.e. the problem in that when the valve opens even slightly, the pressure at the inlet of the pressure control valve tends to drop, which acts to further open the valve, which in turn leads to a further drop in pressure. In order to solve this problem, it is necessary that the pressure in the chamber 6 act on the valve body of the valve portion in a direction against the pressure of the dynamic pressure source, i.e. in the valve closing direction so that the valve is closed depending upon the difference between the pressure of the dynamic pressure source and the pressure in the chamber 6. The arrangement shown in FIG. 2 is one of the simplest and cheapest arrangements that satisfy this requirement.

In this embodiment, the pressure in the chamber 6 is kept higher by a predetermined level than the pressure in the dynamic pressure chamber 5 by opening and closing the passage connecting the dynamic pressure source with the chamber 6. Namely, the pressure control valve 100 has no function of lowering the pressure in the chamber 6. Thus, this valve cannot follow any pressure drop in the dynamic pressure chamber when the brake pedal is released. But this will cause no practical problem because the portion between the pressure control valve 100 and the spool valve 4 in the booster is so rigid that the pressure in the chamber 6 drops quickly in response to a very small slight leakage of fluid through the spool valve 4.

But since the valve body 102 is pressed strongly against the fixed valve seat 105 until the pressure in the chamber 6 drops sufficiently, the durability of the valve may drop due to high contact pressure.

This problem is solved by e.g. providing between the chamber 6 and the dynamic pressure chamber 5 a pressure difference compensation means comprising a liquid-tightly and slidably fitted second piston and a second spring for biasing the piston toward the dynamic pressure chamber. The force of the second spring is set so that the second piston will move in a direction to increase the volume of the fluid pressure introducing chamber when the pressure difference reaches a point that is higher than the range of pressure difference within which the pressure control valve is operative and lower than the pressure difference that may impair the durability of the valve portion of the pressure control valve. Only a slight movement of the second piston can prevent an excessive rise in the pressure difference. Thus, the pressure difference compensation means is not limited to such a piston but may be a spring-loaded diaphragm.

Also, the piston of the pressure control valve itself may have the function of a pressure difference compensation means.

Figure 3:
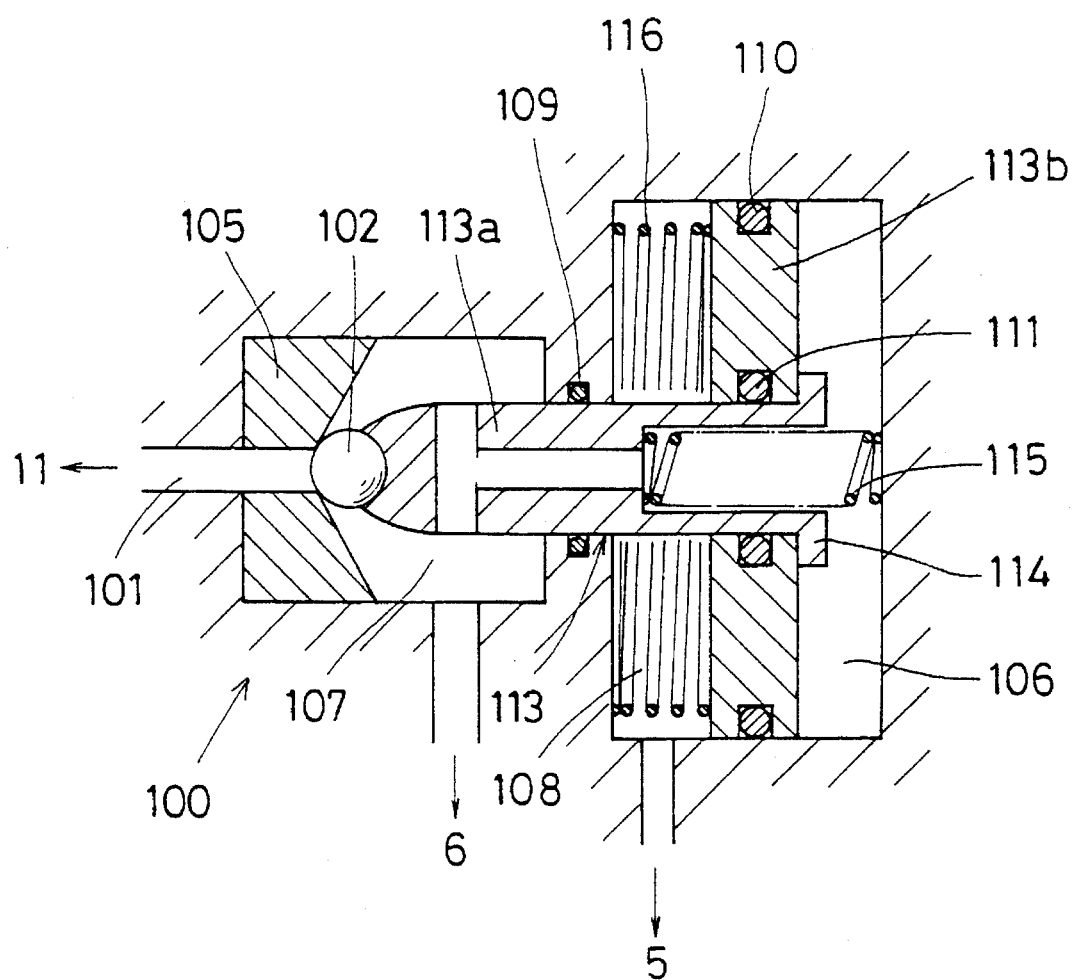
FIG. 3 is a sectional view of another embodiment of a pressure control valve.

FIG. 3 shows the second embodiment of the pressure control valve for use with the hydraulic booster according to this invention. In this embodiment, a large-diameter portion 113b of a pressure control piston 113 is separate from its small-diameter portion 113a carrying the valve body 102 and slidably fitted on the small-diameter portion at its end remote from the valve body 102 with a liquid-tight seal 111 fitted therebetween. The small-diameter portion has a stopper 114 at its end remote from the valve body 102. It prevents any further rightward movement of the large-diameter portion 113b relative to the small-diameter portion 113a from the position shown in the figure. Thus, only the biasing force by the large-diameter portion 113b in the valve opening direction is transmitted to the small-diameter portion 113a. The small-diameter portion 113a and thus the valve body 112 are biased by a spring 115 in the valve closing direction, i.e. the direction against the pressure P1 of the dynamic pressure source. A spring 116 biases the large-diameter portion 113b of the pressure control piston 113 to create a pressure difference between the introducing chamber 6 and the dynamic pressure chamber 5.

The relation of forces produced in the pressure control valve shown in FIG. 3 is given by the following formula.

$$F_1-F_2+P_1 \cdot B+P_3(A-C)=P_2(A-C+B)$$

wherein A is the sectional area of the large-diameter portion 113b of the pressure control piston; B is the sealing area of the valve body 102; C is the sectional area of the small-diameter portion 103a; P1 is the pressure of the dynamic pressure source; P2 is the pressure in the chamber 6; P3 is the pressure in the dynamic pressure chamber 5; and F is the force of the spring 116. Thus, the function of the valve of this embodiment is the same as the valve of the first embodiment.

When the pressure difference increases until P2−P3> $F_1/(A-C)$, the large-diameter portion 113b will move toward the chamber 108 communicating with the dynamic pressure chamber 5, so that the pressure P2 in the chamber 6 decreases quickly. The force of the spring 115 is the only force that tends to bias the valve body 102 in the closing direction. Thus, the valve closing force is kept within a reasonably low level.

What is claimed is:

1. A hydraulic booster comprising: a body having a bore, a power piston axially slidably mounted in said bore formed in said body and having a valve chest, and a dynamic pressure chamber for applying a dynamic pressure to a backside of said power piston;

an input rod provided behind said power piston that is axially slidable independently of said power piston;

a return spring for biasing said power piston in one axial direction;

a pair of seals for sealing an outer periphery of said power piston;

a fluid pressure introducing chamber defined between said pair of seals and between an inner surface of said bore of said body and the outer periphery of said power piston;

a valve means provided in said valve chest which is formed in said power piston and communicates with said dynamic pressure chamber and a depressurization passage for said dynamic pressure chamber; and a pressure control valve provided between a dynamic pressure source and said fluid pressure introducing chamber;

said valve means serving to control the pressure in said dynamic pressure chamber by opening and closing a passage connecting said dynamic pressure chamber with said fluid pressure introducing chamber and a passage connecting said dynamic pressure chamber with said depressurization passage, according to relative axial movement between said power piston and said input rod, said pressure control valve keeping pressure in said fluid pressure introducing chamber higher by a predetermined level than the pressure in said dynamic pressure chamber by opening and closing a passage connecting said dynamic pressure source with said fluid pressure introducing chamber;

wherein said pressure control valve has a valve portion in a form of a poppet valve for opening and closing the passage connecting said dynamic pressure source with said fluid pressure introducing chamber, said valve portion having a valve body on which the pressure of said dynamic pressure source acts in a direction to open said valve and the pressure in said fluid pressure introducing chamber acts in a direction to close said valve.

2. A hydraulic booster as claimed in claim 1 wherein said pressure control valve comprises a first fluid chamber housing said valve portion, a second fluid chamber separated from said first fluid chamber by a partitioning wall, a pressure control piston comprising a small-diameter portion slidably and liquid-tightly inserted through said partitioning wall and carrying said valve body of said valve portion at one end thereof, and a large-diameter portion coupled to said small-diameter portion and housed in said second fluid chamber, said second fluid chamber being partitioned by said large-diameter portion into a first sub-chamber near said first fluid chamber and a second sub-chamber remote from said first fluid chamber, a spring for biasing said pressure control piston in a valve opening direction, and a passage connecting said first fluid chamber with said second sub-chamber, said first fluid chamber communicating with said fluid pressure introducing chamber, and said first sub-chamber communicating with said dynamic pressure chamber.

3. A hydraulic booster as claimed in claim 2, further comprising a pressure differential compensation means having two opposite ends, the pressure in said fluid pressure introducing chamber acting on one of said opposite ends, while the pressure in said dynamic pressure chamber and the biasing force of said spring acting on the other end, said compensation means being movable in such a direction as to increase a volume of said fluid pressure introducing chamber when a difference between forces acting on said opposite ends becomes larger by a predetermined value than said predetermined pressure difference produced by said pressure control valve, until said forces acting on said opposite ends balance with each other.

4. A hydraulic booster as claimed in claim 3 wherein said large-diameter portion of said pressure control piston of said valve body of said pressure control valve is separate from said small-diameter portion and slidably and liquid-tightly fitted on said small-diameter portion, said small-diameter portion having a stopper at an end thereof for restricting movement of said large-diameter portion, and wherein said small-diameter portion is biased by said spring in a direction to close the valve, whereby said large-diameter portion functions as said pressure differential compensation means.

5. A hydraulic booster as claimed in claim 1, further comprising a pressure differential compensation means having two opposite ends, the pressure in said fluid pressure introducing chamber acting on one of said opposite ends, while the pressure in said dynamic pressure chamber and a biasing force of a spring acting on the other end, said compensation means being movable in such a direction as to increase a volume of said fluid pressure introducing chamber when a difference between forces acting on said opposite ends becomes larger by a predetermined value than said predetermined pressure difference produced by said pressure control valve, until said forces acting on said opposite ends balance with each other.

6. A hydraulic booster as claimed in claim 3 wherein a large-diameter portion of a pressure control piston is separate from a small-diameter portion and slidably and liquid-tightly fitted on said small-diameter portion, said small-diameter portion having a stopper at the other end thereof for restricting movement of said large-diameter portion, and wherein said small-diameter portion is biased by said spring in a direction to close the valve, whereby said large-diameter portion functions as said pressure differential compensation means.

* * * * *